United States Patent
Lo et al.

(10) Patent No.: US 9,665,219 B2
(45) Date of Patent: May 30, 2017

(54) SINGLE LAYER SOLUTION TOUCH PANEL

(71) Applicant: HANNSTOUCH SOLUTION INCORPORATED, Tainan (TW)

(72) Inventors: Wei-Ren Lo, Tainan (TW); David Lu, New Taipei (TW); Jia-Ming Ye, New Taipei (TW)

(73) Assignee: HANNSTOUCH SOLUTION INCORPORATED, Tainan (TW)

( * ) Notice: Subject to any disclaimer, the term of this patent is extended or adjusted under 35 U.S.C. 154(b) by 121 days.

(21) Appl. No.: 14/451,423

(22) Filed: Aug. 4, 2014

(65) Prior Publication Data

US 2015/0234495 A1    Aug. 20, 2015

(30) Foreign Application Priority Data

Feb. 20, 2014  (TW) .............................. 103202956 U

(51) Int. Cl.
*G06F 3/044* (2006.01)
*G06F 3/041* (2006.01)
*G06F 3/045* (2006.01)

(52) U.S. Cl.
CPC .............. *G06F 3/044* (2013.01); *G06F 3/045* (2013.01); *G06F 3/0416* (2013.01); *G06F 3/0418* (2013.01); *G06F 2203/04103* (2013.01); *G06F 2203/04112* (2013.01); *G06F 2203/04113* (2013.01)

(58) Field of Classification Search
CPC ........ G06F 3/0416; G06F 3/044; G06F 3/045; G06F 2203/04113; G06F 2203/04112

USPC .................................................. 345/173-174
See application file for complete search history.

(56) References Cited

U.S. PATENT DOCUMENTS

| | | | | |
|---|---|---|---|---|
| 9,312,407 | B2* | 4/2016 | Tsutsumi | H01L 31/02249 |
| 2007/0279395 | A1* | 12/2007 | Philipp | G06F 3/044 345/173 |
| 2012/0013544 | A1* | 1/2012 | Philipp | G06F 3/041 345/173 |
| 2012/0255167 | A1* | 10/2012 | Badaye | G06F 3/044 29/846 |
| 2013/0100038 | A1* | 4/2013 | Yilmaz | G06F 3/044 345/173 |
| 2013/0181943 | A1* | 7/2013 | Bulea | G06F 3/044 345/174 |
| 2014/0267947 | A1* | 9/2014 | Yeh | G06F 3/03547 349/12 |
| 2014/0375910 | A1* | 12/2014 | Tada | G06F 3/044 349/12 |

(Continued)

*Primary Examiner* — Amare Mengistu
*Assistant Examiner* — Gloryvid Figueroa-Gibson
(74) *Attorney, Agent, or Firm* — CKC & Partners Co., Ltd.

(57) ABSTRACT

A single layer solution touch panel includes a substrate, sensing patterns, conductive circuit patterns and a controller. The substrate includes a touch area and a peripheral area. The sensing patterns are disposed on the touch area. The conductive circuit patterns are disposed at the touch area and the peripheral area, in which the sensing patterns and the conductive circuit patterns are arranged alternately. At least a part of material of the sensing patterns is different from at least a part of material of the conductive circuit patterns. The controller is electrically connected to the sensing patterns via the conductive circuit patterns respectively.

15 Claims, 11 Drawing Sheets

(56) References Cited

U.S. PATENT DOCUMENTS

2015/0002458 A1* 1/2015 Lee .................. G06F 3/045
 345/174

* cited by examiner

SINGLE LAYER SOLUTION TOUCH PANEL

RELATED APPLICATIONS

This application claims priority to Taiwan Application Serial Number 103202956, filed Feb. 20, 2014, which is herein incorporated by reference.

BACKGROUND

Field of Invention

The present invention relates to a touch panel. More particularly, the present invention relates to a single layer solution panel.

Description of Related Art

In the recent years, thin flat-panel displays have become popular in the various applications of electronic devices. For the purposes of use convenience, concise appearances and multifunction, the input devices of the electronic devices such as information products have changed to touch panels from mouse, keyboards and other traditional input devices.

As the development of the flat-panel displays and the touch input devices, for users enjoying bigger visual screens and easier operation modes in limited spaces, some electronic products integrate the touch panel and the display panel to form a touch display panel.

In principle, when a conductive object (such as a finger(s)) contacts the touch-sensing array of a touch panel, the electronic characteristics (such as resistance or capacitance) of the touch-sensing array change, which causes a change in the potential difference of the touch-sensing array. The change of the electronic characteristic results in transmitting a controlling signal to the outer controlling circuit board, and the signal can be computed and analyzed by a processor to obtain results. Next, the outer controlling circuit hoard sends a displaying signal to the display panel, by which an image is displayed before the users.

Since the touch panel is disposed over the display panel, the electrodes or the conductive wires of the touch panel have been made from transparent conductive material. However, the transparent conductive material has relative higher resistance, which limits the applications of the touch panels in larger size. To address the limitation, metal conductive meshes have been applied but may blur the images due to a Moiré phenomenon from the overlapping thin wires of the metal meshes.

SUMMARY

This disclosure provides a structure of a single layer solution touch panel using both metal and transparent conductive material, such that a Moiré phenomenon can be prevented, and a drawback due to higher resistance in large-scale application is reduced.

According to one aspect of the present invention, a single layer solution touch panel includes a substrate, sensing patterns, conductive circuit patterns and a controller. The substrate includes a touch area and a peripheral area. The sensing patterns are disposed on the touch area. The conductive circuit patterns are disposed at the touch area and the peripheral area, in which the sensing patterns and the conductive circuit patterns are arranged alternately. At least a part of material of the sensing patterns is different from at least a part of material of the conductive circuit patterns. The controller is electrically connected to the sensing patterns via the conductive circuit patterns respectively.

This disclosure provides a single layer solution touch panel using both metal and transparent conductive materials simultaneously, so that the problem of high resistance occurred traditionally by merely using transparent conductive material can be solved effectively, and the Moiré phenomenon occurred due to the overlapping of the wires of metal meshes in traditional designs can be prevented.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
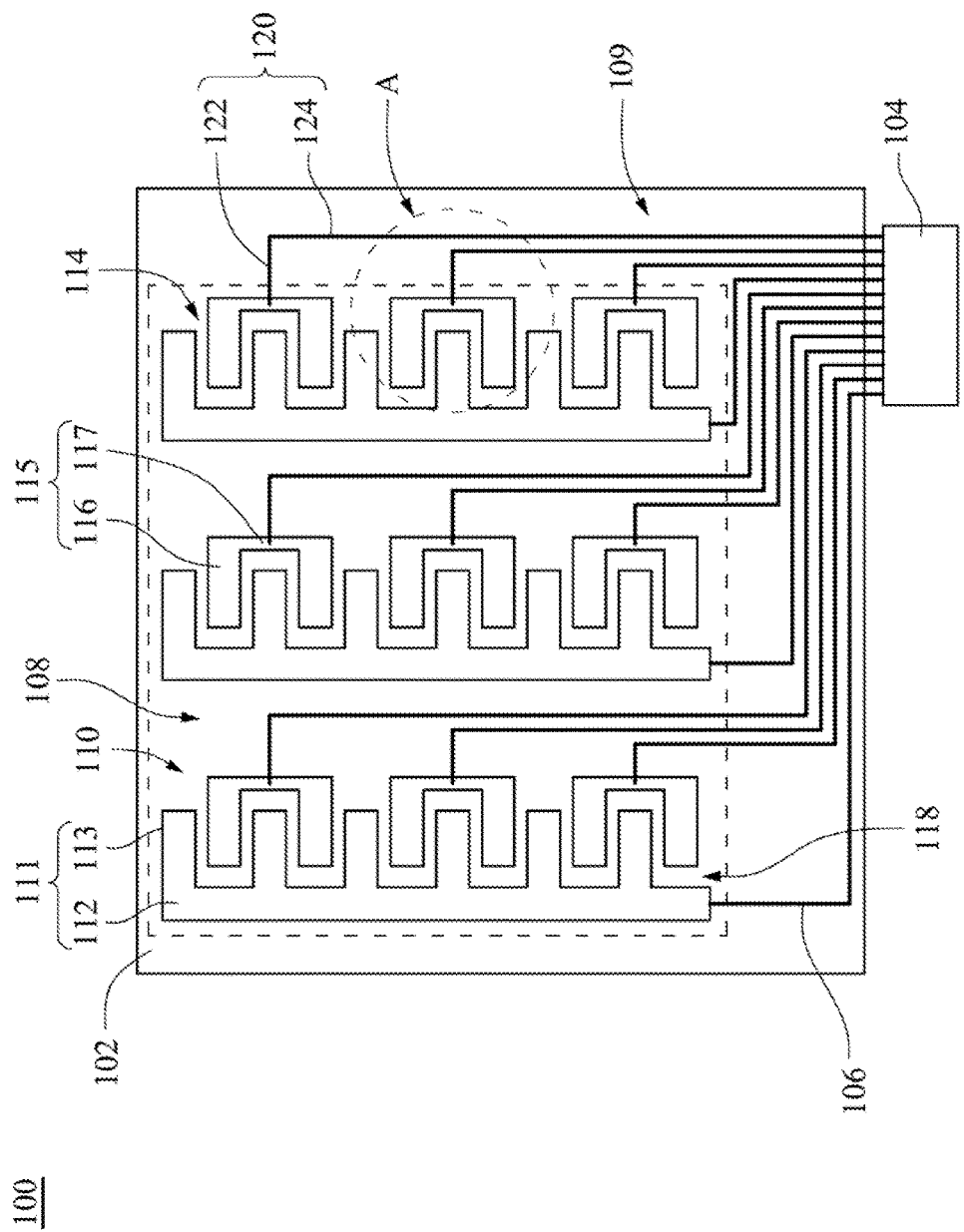
FIG. 1A is a top view of the touch panel according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

For one layer touch panels, especially for the touch panels with large sizes, using transparent conductive material as electrodes and conductive wires may result in over high resistance. However, metal meshes with a lower resistance may blur the images due to a Moiré phenomenon from the overlapping wires at the arrangement of the display panel. This disclosure provides a single layer solution touch panel using both high and low transparent conductive materials so as to solve the problem of high resistance or the Moiré phenomenon in the traditional touch panel.

FIG. 1A is a top view of the touch panel according to a first embodiment of the present invention. A single layer solution touch panel 100 includes a substrate 102, a controller 104, sensing patterns 110, and conductive circuit patterns 120. For making the illustration succinct, the arrangement of the sensing patterns 110 and the conductive circuit patterns 120 is not illustrated with virtual scale or quantity.

The substrate 102 includes a touch area 108 illustrated as a dotted line area and a peripheral area 109, in which the touch area 108 is an area that can be operated with a user touching. The sensing patterns 110 are arranged in the touch area 108, and the peripheral area 109 is disposed around the touch area 108 for providing a passage with route of outer wires. The substrate 102 can be a rigid substrate, and the material of the rigid substrate can be glass, acrylic, polyethylene terephthalate (PET), polymethyl methacrylate (PMMA), or other material. On the other hand, the substrate 102 can be a flexible substrate, and the material of the flexible substrate can be a plastic film or other material. The sensing patterns 110 and the conductive circuit patterns 120 are disposed on the substrate 102. The sensing patterns 110 are arranged in the touch area 108, and the conductive circuit patterns 120 are arranged in the touch area 108 and the peripheral area 109. In the touch area 108, the sensing patterns 110 and the conductive circuit patterns 120 are arranged alternately, and hence each raw of the conductive circuit patterns 120 is disposed between each two adjacent raw of the sensing patterns 110.

Each of the sensing patterns 110 includes a sensing main unit 111 and sensing subunits 115. The sensing main unit 111 includes a main electrode 112, finger-shaped electrodes 113, and openings 114. The finger-shaped electrodes 113 extending from the main electrode 112 are arranged regularly and alternately. Scale and position of the openings 114 are defined by the finger-shaped electrodes 113. Each of sensing subunits 115 includes a pair of rectangular electrodes 116 and a connective portion 117. The rectangular electrodes 116 in pair are disposed in parallel and connected to each other via the connective portion 117 between them. Shapes of the sensing main unit 111 and the sensing subunits 115 are corresponding to each other, and the sensing subunits 115 and the sensing main unit 111 are electronically insulated.

In the present embodiment, the whole sensing patterns 110 including sensing main unit 111 and sensing subunits 115 are made of a high transparent conductive material. The high transparent conductive material can be transparent conductive oxide (TCO), such as indium tin oxides, zinc oxides, aluminum doped zinc oxides, gallium doped zinc oxides, indium doped zinc oxides, graphene, or other transparent conductive materials.

Each of the conductive circuit patterns 120 includes a short bar 122 and a long bar 124, and the shirt bar 122 and the ling bar 124 are interconnected to each other for electronically signaling, in which each of the conductive circuit patterns 120 is corresponding to the different sensing subunits 115. The short bar 122 is connected to the connective portion 117 of the corresponding sensing subunit 115, and the long bar 124 is connected to the controller 104. The sensing patterns 110 are electronically connected to the controller 104 via the conductive circuit patterns 120 respectively.

In the present embodiment, the whole conductive circuit patterns 120 including the short bar 122 and the long bar 124 are made of a low transparent conductive material. The low transparent conductive material can be chromium, molybdenum, silvers, aluminum, coppers, nanometals such as nano silvers), and other metals or the compositions of them. The resistance of the low transparent conductive material is lower than the resistance of the high transparent conductive material.

Figure 1B:
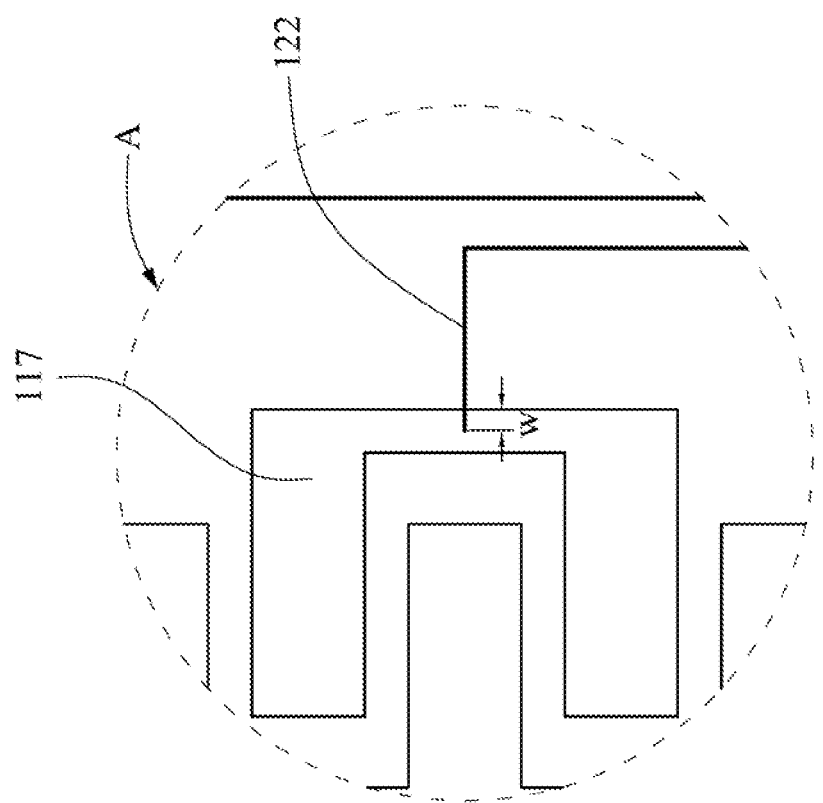
FIG. 1B is an enlarged view of the area A in FIG. 1A.

The high transparent conductive material partially overlaps low transparent conductive material at an interconnecting region between them for ensuring electrical connection being available. Reference is made to FIG. 1B. FIG. 1B is an enlarged view of the area A in FIG. 1A. In the area A, the connective portion 117 and the short bar 122 are partially overlapped with the interconnecting region between them. For example, the overlapped distance w between the connective portion 117 and the short bar 122 can be from 10 μm to 100 μm.

Reference is now made to FIG. 1A. In the single layer solution touch panel 100, the sensing patterns 110 are made of the high transparent conductive material, and the conductive circuit patterns 120 are made of the low transparent conductive material, such as metal material. Therefore, comparing to the traditional touch panels only using single transparent conductive material, the resistance of the single layer solution touch panel 100 is lower. Comparing to the traditional touch panels only using metal, the single layer solution touch panel 100 reduces the occurrence of the Moiré phenomenon.

The controller 104 is disposed at a side of the substrate 102 for receiving signal. The single layer solution touch panel 100 further includes metal lines 106 for connecting the main electrode 112 to the controller 104.

In the framework of the single layer solution touch panel 100 of the present embodiment, a touch-sensing array is formed by each of the sensing main unit 111 and the sensing subunits 115 corresponding to the sensing main unit 111, in which a capacitance is induced between the sensing main unit 111 and the sensing subunit 115. The single layer solution touch panel 100 includes at least one touch-sensing array.

When a user takes a touch operation with finger(s) or a stylus, the capacitance of the touch-sensing array with the corresponding touch point is changed. The changed capacitance is sent to the controller 104 via the conductive circuit patterns 120 and the metal lines 106, and the touch point is exactly determined by orderly scanning and driving the sensing main unit 111 and sensing subunits 115.

As described above, the touch operation of the single layer solution touch panel 100 in the present embodiment is related to the touch-sensing array. However, a person having ordinary skill in the art can make a proper modification to shape, quantity, scale, relative location of the sensing patterns 110 and the conductive circuit patterns 120.

The principle of the single layer solution touch panel 100 how to determine the locations touched by the capacitance changed and the frame from the sensing patterns 110 and the conductive circuit patterns 120 are described as the foregoing embodiments. In the following embodiments, the frame and the principle are not stated.

In this document, the high transparent conductive material can be indium tin oxides, zinc oxides, aluminum doped zinc oxides, gallium doped zinc oxides, indium doped zinc oxides, graphene, or other transparent conductive materials. The low transparent conductive material can be chromium, molybdenum, silvers, aluminum, coppers, nanometals (such as nano silvers), and other metals or the compositions of them. The light transmittance of the high transparent conductive material is over and above 90%, and the light transmittance of the low transparent conductive material is not greater than 10%.

Figure 2:
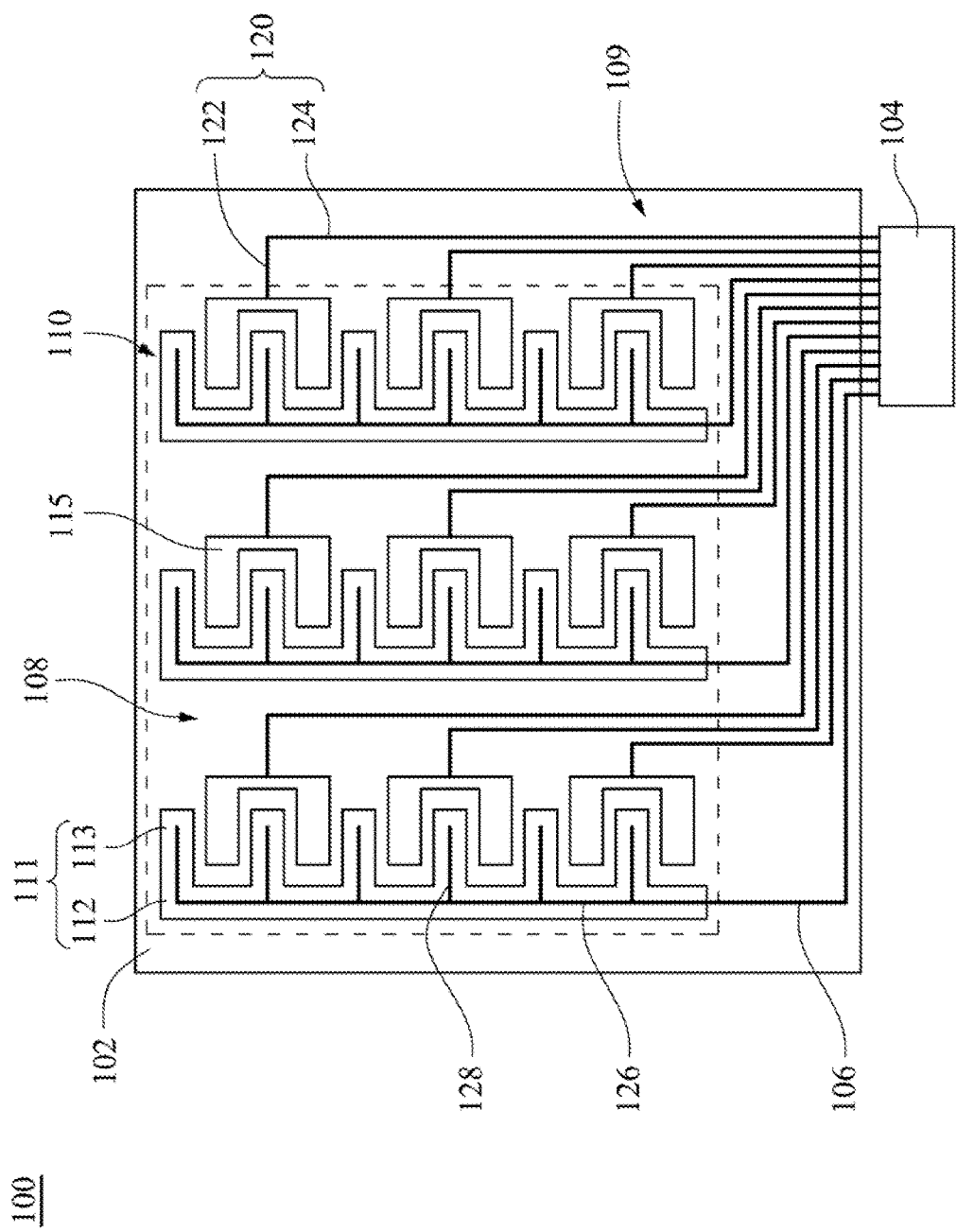
FIG. 2 is a top view of the touch panel according to a second embodiment of the present invention.

FIG. 2 is a top view of the touch panel according to a second embodiment of the present invention. A single layer solution touch panel 100 includes a substrate 102, a controller 104, sensing patterns 110 and conductive circuit patterns 120. For making the illustration succinct, the arrangement of the sensing patterns 110 and the conductive circuit patterns 120 is not illustrated with virtual scale or quantity.

The substrate 102 includes a touch area 108 and a peripheral area 109, and the sensing patterns 110 and the conductive circuit patterns 120 are disposed on the substrate 102. The sensing patterns 110 are disposed in the touch area 108, and the conductive circuit patterns 120 are disposed in the touch area 108 and the peripheral area 109.

Each of the sensing patterns 110 includes a sensing main unit 111 and sensing subunits 115. The sensing main unit 111 includes a main electrode 112, main line 126 finger-shaped electrodes 113 and extending lines 128. The main line 126 is disposed on a surface of the sensing main unit 111 with electrically connecting to the sensing main unit 111, in which the position of the main line 126 can be regarded as a symmetric axis of the main electrode 112. The extending lines 128 extending from the main line 126 are disposed on a surface of the finger-shaped electrodes 113 with electrically connecting to the finger-shaped electrodes 113, in which the position of the extending lines 128 can be regarded as a symmetric axis of the finger-shaped electrodes 113.

The main electrode 112, the finger-shaped electrodes 113 and the sensing subunits 115 are made of a high transparent conductive material. The main line 126 and the extending lines 128 are made of a low transparent conductive material.

Each of the conductive circuit patterns 120 includes a short bar 122 and a long bar 124, and the shirt bar 122 and the ling bar 124 are interconnected to each other, in which the short bar 122 and the long 124 are made of the low transparent conductive material.

In the present embodiment, the metal lines 106 can be regarded as extending from the main line 126 with electrically connecting to the main line 126 and are connected to the controller 104.

A difference between the present embodiment and the first embodiment is a combination of the main line 126, the extending lines 128 and the sensing main unit 111, in which the main line 126 and the extending lines 128 are made of the low transparent conductive material. Under the touch operation, when the capacitance of the sensing main unit 111 using for sensing is changed, signal can be directly sent from the metal lines 106 to the controller 104 with faster passing in the main line 126 and the extending lines 128.

Figure 3:
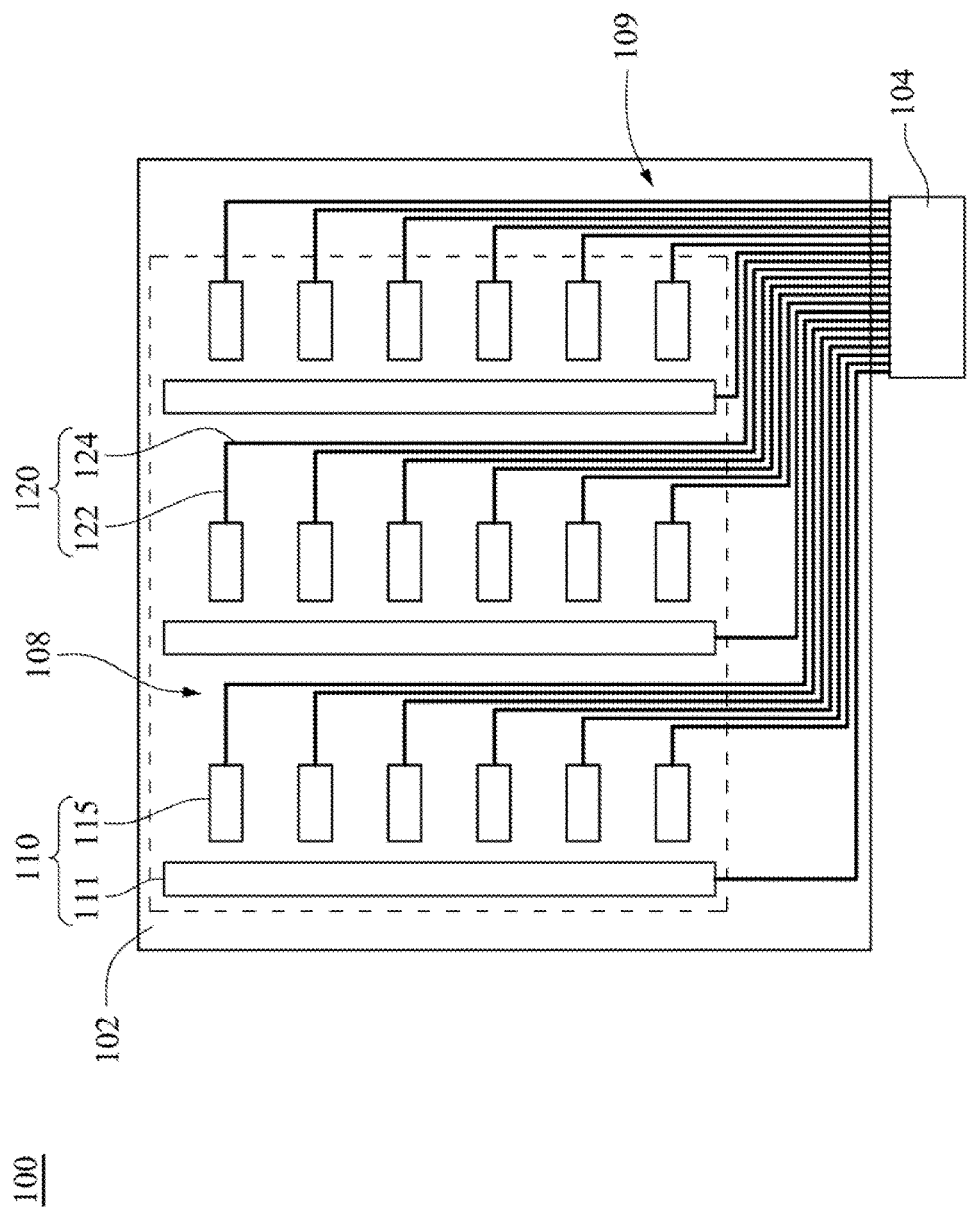
FIG. 3 is a top view of the touch panel according to a third embodiment of the present invention.

FIG. 3 is a top view of the touch panel according to a third embodiment of the present invention. A single layer solution touch panel 100 includes a substrate 102, a controller 104, sensing patterns 110 and conductive circuit patterns 120.

The sensing patterns 110 are disposed in the touch area 108, and the conductive circuit patterns 120 are disposed in the touch area 108 and the peripheral area 109. Each of the sensing patterns 110 includes a sensing main unit 111 and sensing subunits 115, in which the sensing main unit 111 and the sensing subunits 115 are made of a high transparent conductive material. The sensing main unit 111 is a bar-shaped electrode, and sensing subunits 115 are rectangular electrodes.

A difference between the present embodiment and the first embodiment is the shape of the sensing subunits 115 and the sensing main unit 111 being bar-shaped (rectangular), and each of the sensing subunits 115 directly connected to the controller 104 via the conductive circuit patterns 120.

Figure 4:
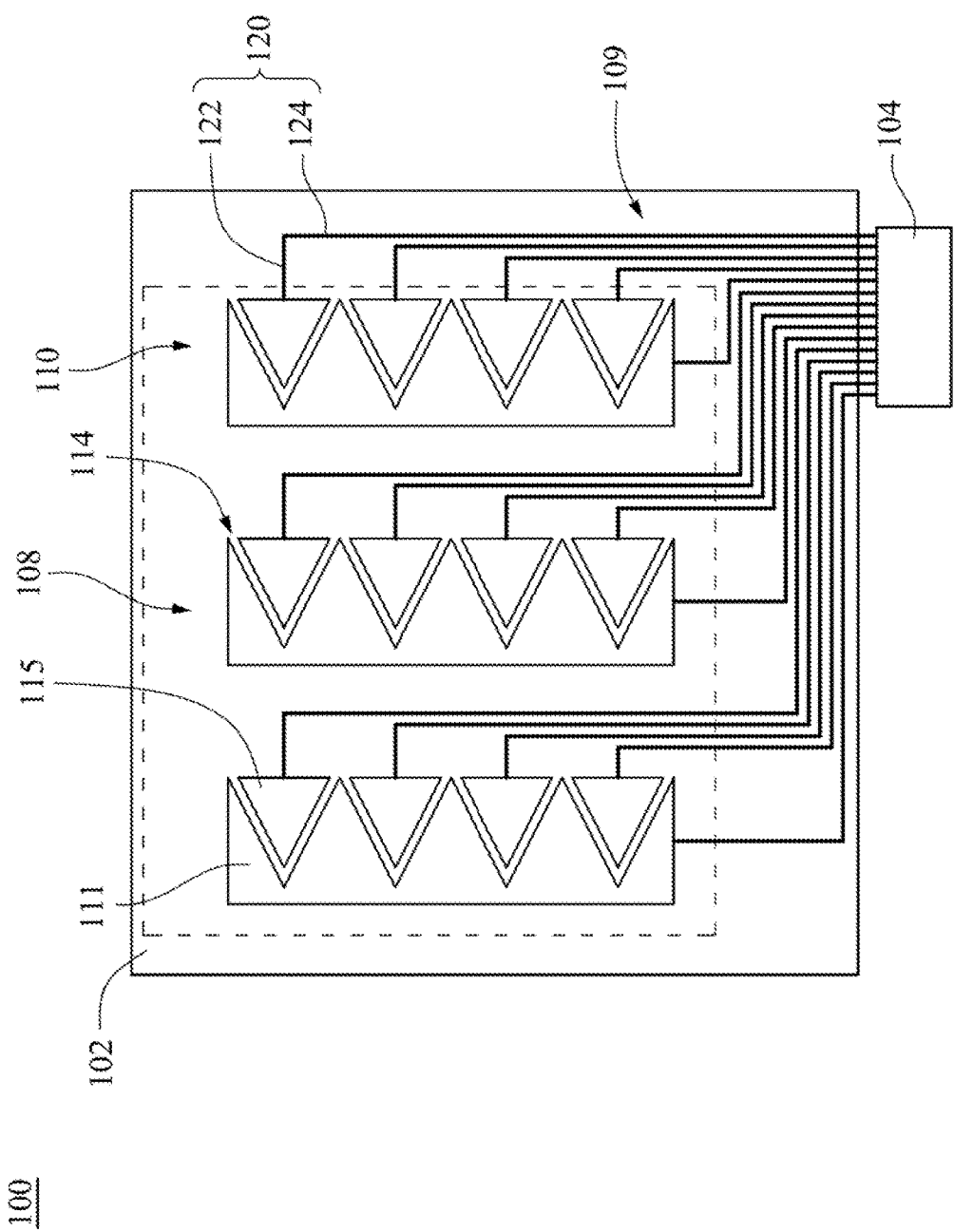
FIG. 4 is a top view of the touch panel according to a fourth embodiment of the present invention.

FIG. 4 is a top view of the touch panel according to a fourth embodiment of the present invention. A single layer solution touch panel 100 includes a substrate 102, a controller 104, sensing patterns 110 and conductive circuit patterns 120. The sensing patterns 110 are disposed in the touch area 108, and the conductive circuit patterns 120 are disposed in the touch area 108 and the peripheral area 109.

Each of the sensing patterns 110 includes a sensing main unit 111 and sensing subunits 115. The sensing main unit 111 is a zigzag electrode formed by interconnecting triangular patterns, and the sensing subunits 115 are triangular electrodes. The sensing main unit 111 and the sensing subunits 115 are made of a high transparent conductive material.

The sensing subunits 115 are arranged regularly and alternately at a side of the sensing main unit 111, and size and position of openings 114 are defined by the zigzag sensing main unit 111. Size and scale of the sensing subunits 115 are corresponding to the openings 114 of the sensing main unit 111, and the sensing subunits 115 are arranged in the openings 114 approximately.

The conductive circuit patterns 120 are directly connected to the corresponding sensing subunits 115 and the controller 104, such that the sensing patterns 110 are electrically connected to the controller 104 via the conductive circuit patterns 120. In the present embodiment, the shape of the sensing main unit 111 is zigzag, and the shape of the sensing subunits 115 corresponding to the sensing main unit 111 is triangular. Therefore, the capacitance induced between the sensing main unit 111 and the sensing subunits 115 is enhanced.

In the following embodiments, the descriptions are made to discuss the variations of the materials in the single layer solution touch panel 100. The description of the variations of the shape of the sensing main unit 111 and the sensing subunits 115 is not stated again. A person having ordinary skill in the art can make a proper modification to the shape of the sensing main unit 111 and the sensing subunits 115.

Figure 5:
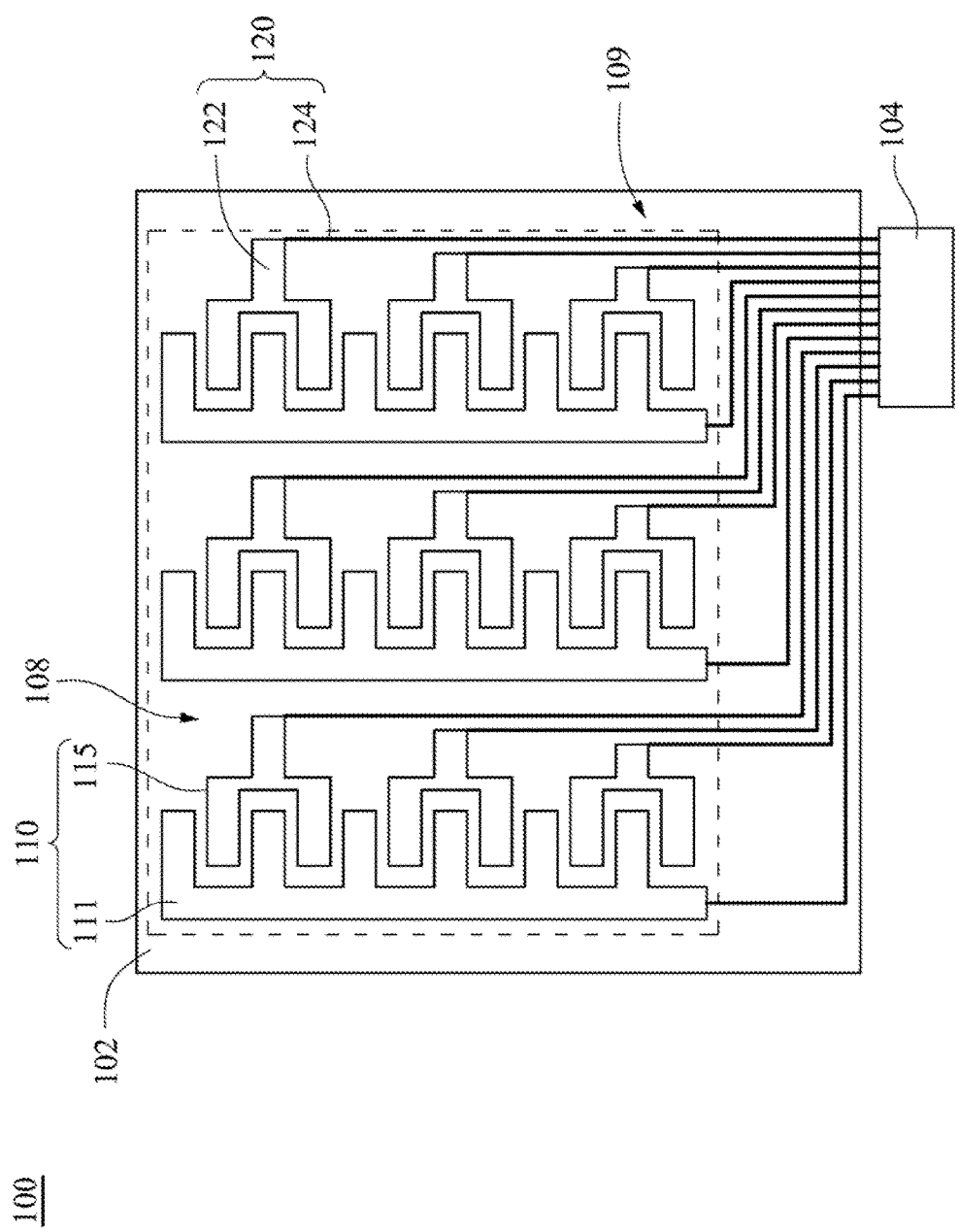
FIG. 5 is a top view of the touch panel according to a fifth embodiment of the present invention.

FIG. 5 is a top view of the touch panel according to a fifth embodiment of the present invention. A single layer solution touch panel 100 includes a substrate 102, a controller 104, sensing patterns 110 and conductive circuit patterns 120.

The substrate 102 includes a touch area 108 and a peripheral area 109, and the sensing patterns 110 and the conductive circuit patterns 120 are disposed on the substrate 102. The sensing patterns 110 are disposed in the touch area 108, and the conductive circuit patterns 120 are disposed in the touch area 108 and the peripheral area 109.

Each of the sensing patterns 110 includes a sensing main unit 111 and sensing subunits 115, in which the sensing main unit 111 and the sensing subunits 115 are made of a high transparent conductive material.

Each of the conductive circuit patterns 120 includes a short bar 122 and a long bar 124, and the shirt bar 122 and the ling bar 124 are interconnected to each other. The short bar 122 is made of the high transparent conductive material, and the long bar 124 is made of a low transparent conductive material. The short bar 122 and the long bar 124 are orthogonal.

A difference between the present embodiment and the first embodiment is the material of the short bar 122 used for sending electrical signal, in which the material of the short bar 122 is replaced by the high transparent conductive material with higher resistance. In the conductive circuit patterns 120, the long bar 124 is used for mainly sending the electrical signal, and the short bar 124 is a secondary component used for sending the electrical signal. Therefore, the replacement would not affect performance of the electrical communication in the single layer solution touch panel 100.

Figure 6:
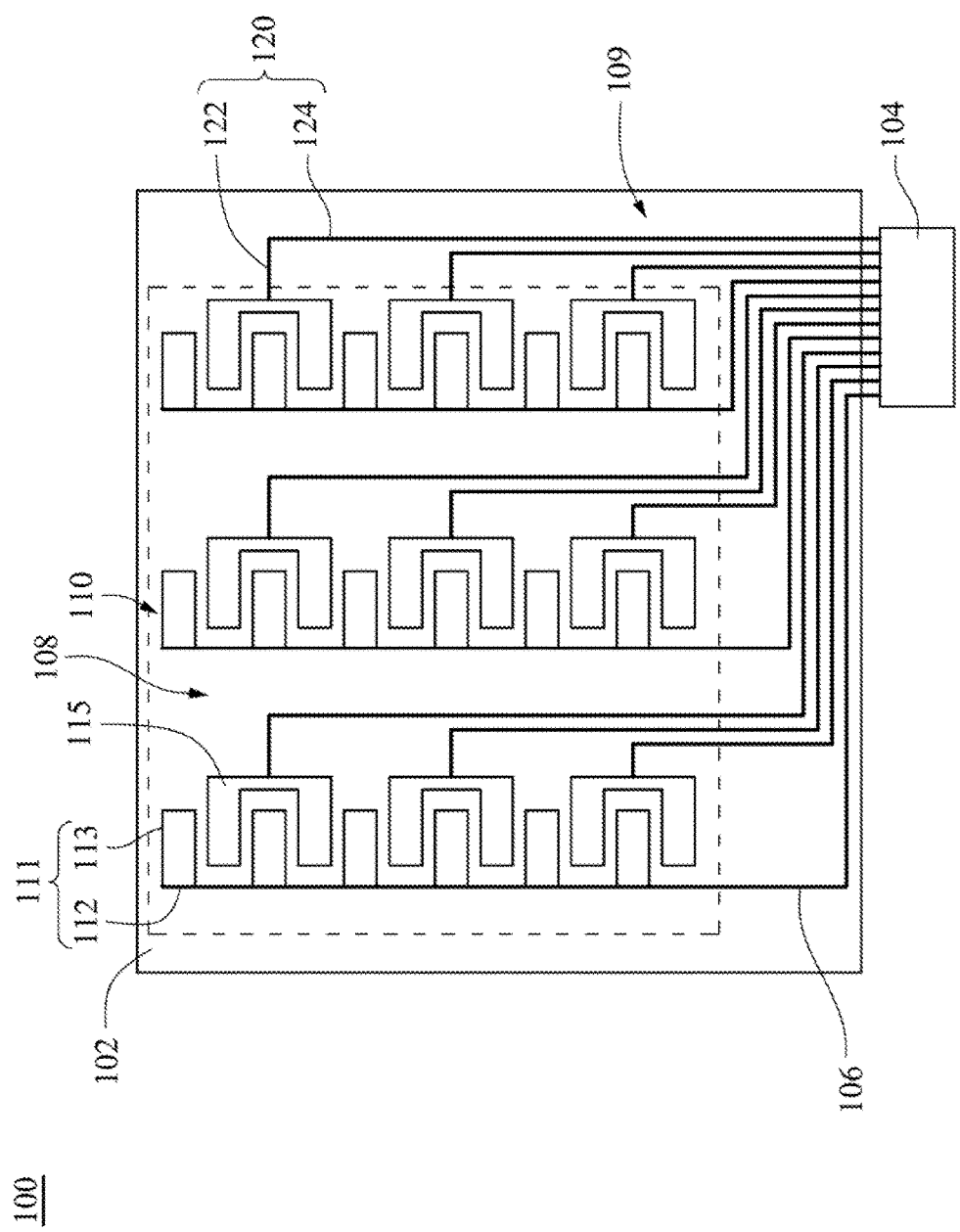
FIG. 6 is a top view of the touch panel according to a sixth embodiment of the present invention.

FIG. 6 is a top view of the touch panel according to a sixth embodiment of the present invention. A single layer solution touch panel 100 includes a substrate 102, a controller 104, sensing patterns 110 and conductive circuit patterns 120.

The substrate 102 includes a touch area 108 and a peripheral area 109, and the sensing patterns 110 and the conductive circuit patterns 120 are disposed on the substrate 102. The sensing patterns 110 are disposed in the touch area 108, and the conductive circuit patterns 120 are disposed in the touch area 108 and the peripheral area 109.

Each of the sensing patterns 110 includes a sensing main unit 111 and sensing subunits 115. The sensing main unit 111 includes a main electrode 112 and finger-shaped electrodes 113 extending from the main electrode 112 with a regular and alternate arrangement. The sensing subunits 115 and the finger-shaped electrodes 113 are made of a high transparent conductive material, and the main electrode 112 is made of a low transparent conductive material. In the present embodiment, metal lines 106 can be regarded as extending from the main line 126 with electrically connecting and are connected to the controller 104.

Each of the conductive circuit patterns 120 includes a short bar 122 and a long bar 124, and the shirt bar 122 and the ling bar 124 are interconnected to each other, and the short bar 122 and the long bar 124 are made of the low transparent conductive material.

A difference between the present embodiment and the first embodiment is the sensing main unit 111 using both the high and low transparent conductive materials. The material of the main electrode 112 is replaced by the low transparent conductive material, such that the resistance of the longer main electrode 112 is reduced. In the sensing patterns 110, the finger-shaped electrodes 113 and the sensing subunits 115 with greater area are still made of TCO, such that the occurrence of the Moiré phenomenon is reduced.

Figure 7:
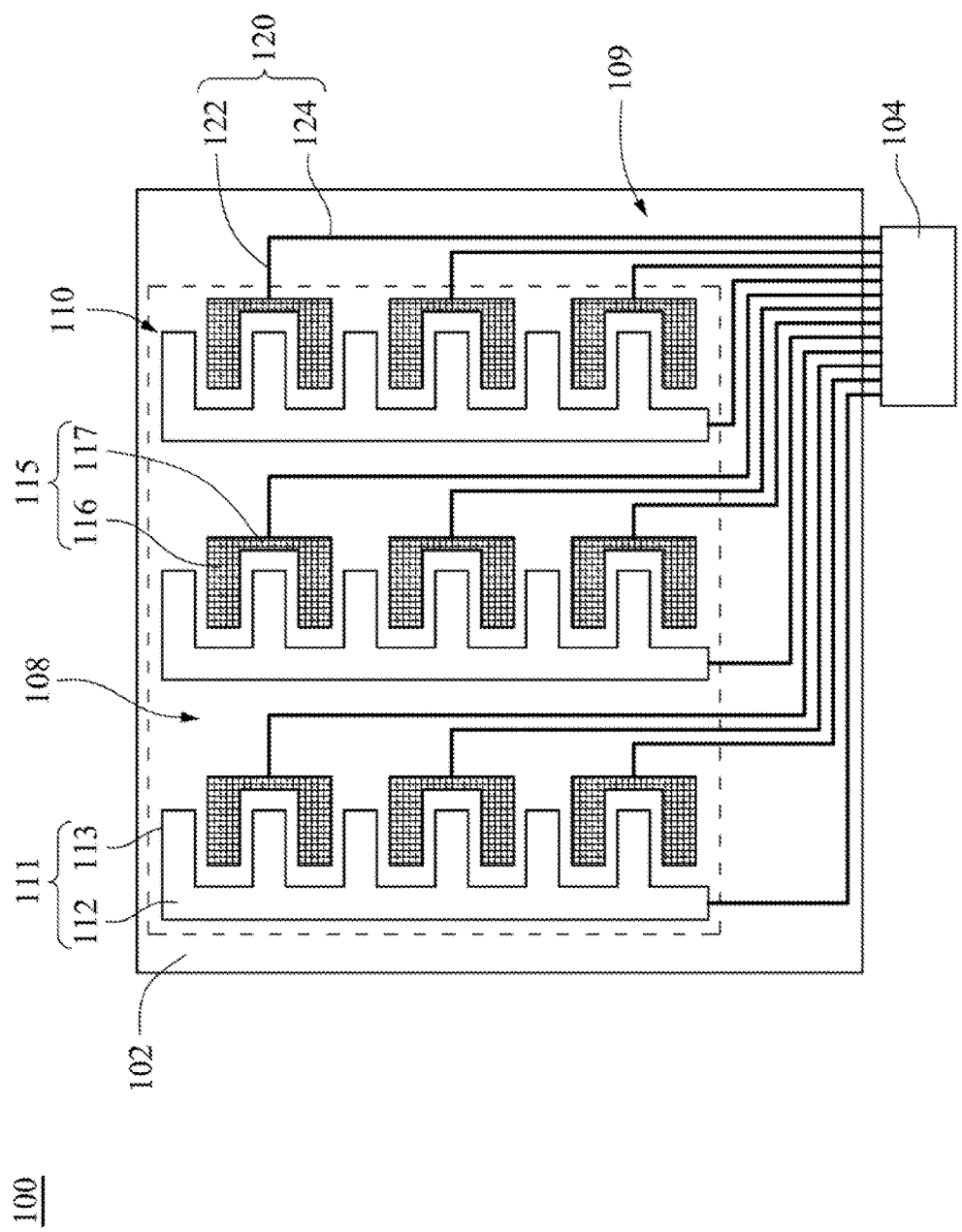
FIG. 7 is a top view of the touch panel according to a seventh embodiment of the present invention.

FIG. 7 is a top view of the touch panel according to a seventh embodiment of the present invention. A single layer solution touch panel 100 includes a substrate 102, a controller 104, sensing patterns 110 and conductive circuit patterns 120.

The substrate 102 includes a touch area 108 and a peripheral area 109, and the sensing patterns 110 and the conductive circuit patterns 120 are disposed on the substrate 102. The sensing patterns 110 are disposed in the touch area 108, and the conductive circuit patterns 120 are disposed in the touch area 108 and the peripheral area 109.

Each of the sensing patterns 110 includes a sensing main unit 111 and sensing subunits 115. The sensing main unit 111 includes a main electrode 112 and finger-shaped electrodes 113 extending from the main electrode 112 with a regular and alternate arrangement. The sensing main unit 111 is made of a high transparent conductive material.

Each of the sensing subunits 115 includes a pair of rectangular electrodes 116 and a connective portion 117.

The rectangular electrodes 116 and the connective portion 117 are made of a low transparent conductive material, and a frame of the rectangular electrodes 116 and the connective portion 117 is mesh structure. In other words, the rectangular electrodes 116 and the connective portion 117 include the frame constructed by the metal thin wires and the latticed metal wires inside the frame.

Differences between the present embodiment and the first embodiment are the material and the structure of the sensing subunits 115. The frame of the sensing subunits 115 in the present embodiment is the metal mesh structure, and the sensing main unit 111 inducing a capacitance with the sensing subunits 115 is made of the high transparent conductive material. Therefore, comparing to traditional touch panels merely using transparent conductive materials, the present embodiment using both the high and low transparent conductive materials has a lower resistance. Comparing to traditional touch panels only using metals, the present embodiment reduces the occurrence of the Moiré phenomenon.

Figure 8:
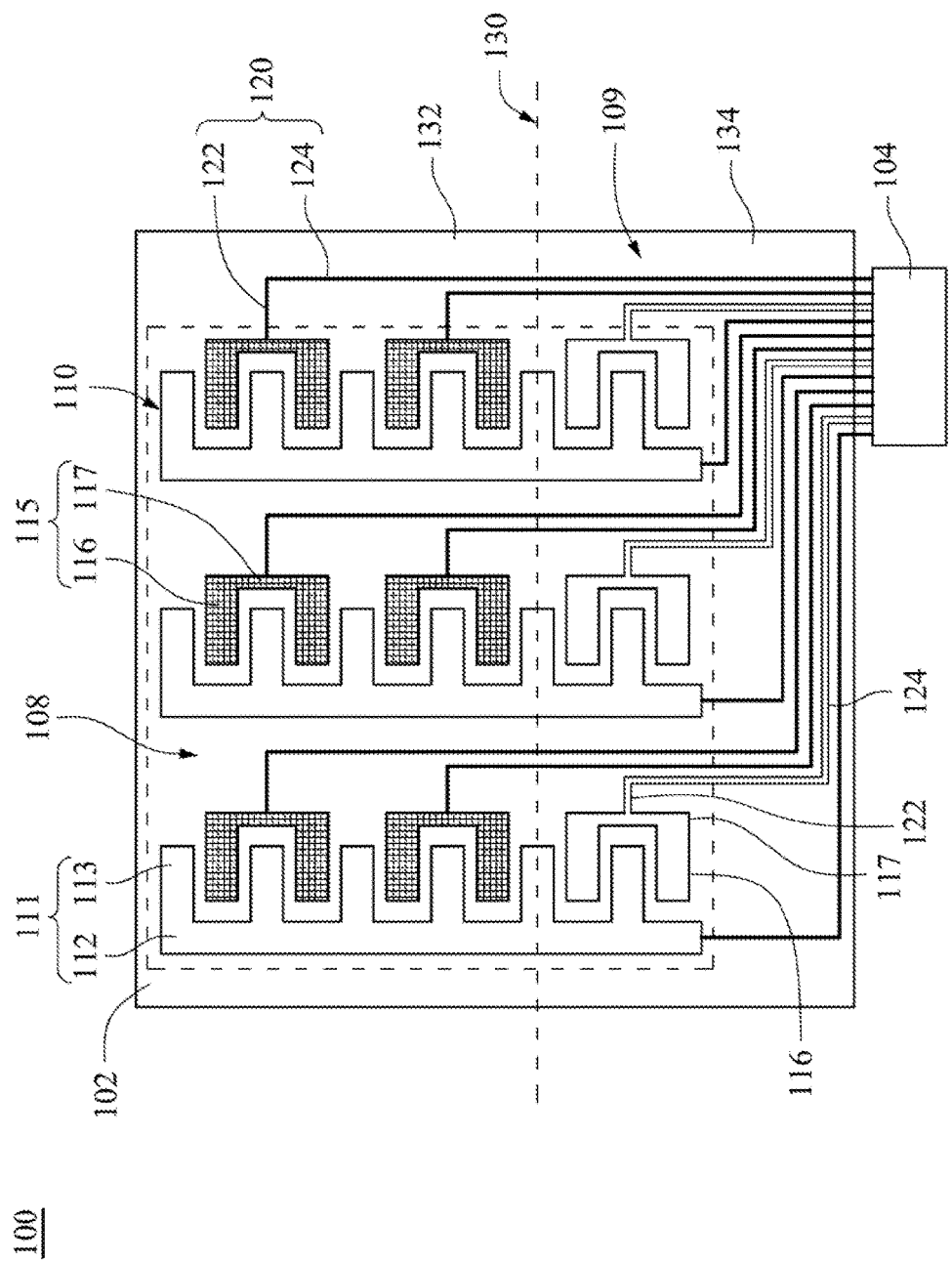
FIG. 8 is a top view of the touch panel according to an eighth embodiment of the present invention.

FIG. 8 is a top view of the touch panel according to an eighth embodiment of the present invention. A single layer solution touch panel 100 includes a substrate 102, a controller 104, sensing patterns 110 and conductive circuit patterns 120.

The substrate 102 includes a touch area 108 and a peripheral area 109, and the sensing patterns 110 and the conductive circuit patterns 120 are disposed on the substrate 102. The sensing patterns 110 are disposed in the touch area 108, and the conductive circuit patterns 120 are disposed in the touch area 108 and the peripheral area 109.

Each of the sensing patterns 110 includes a sensing main unit 111 and sensing subunits 115. The sensing main unit 111 includes a main electrode 112 and finger-shaped electrodes 113 extending from the main electrode 112 with a regular and alternate arrangement. The sensing main unit 111 is made of a high transparent conductive material.

The single layer solution touch panel 100 further includes a partition line 130 for defining the substrate 102 into a first area 132 and a second area 134, in which a distance between the first area 132 and the controller 104 is greater than a distance between the second area 134 and the controller 104. In this embodiment, material of the sensing subunits 115 in the first area 132 is different from material of the sensing subunits 115 in the second area 134.

In the first area 132, the rectangular electrodes 116 and the connective portion 117 are made of a low transparent conductive material and are metal mesh structure. In the second area 134, the rectangular electrodes 116 and the connective portion 117 are made of a high transparent conductive material. However, a person having ordinary skill in the art can make a proper modification to the position of the partition line 130 for defining the ratio of the first area 132 to the second area 134.

The conductive circuit patterns 120 are used for connecting the sensing subunits 115 to the controller 104. The materials of the conductive circuit patterns 120, including the high and low transparent conductive material, are according to the sensing subunits 115 connected to the conductive circuit patterns 120.

The conductive circuit patterns 120 connected to the sensing subunits 115 in the first area 132 are made of the low transparent conductive material. The conductive circuit patterns 120 connected to the sensing subunits 115 in the second area 134 are made of the high transparent conductive material.

A difference between the present embodiment and the seventh embodiment is the sensing subunits 115 including two arrangements and types. The sensing subunits 115 have the transparent electrode type and the metal mesh structure type. In the substrate 102, the sensing subunits 115 disposed at a side near the controller 104 (at the second area 134) and the corresponding conductive circuit patterns 120 connected to the sensing subunits 115 are made of the high transparent conductive material. The sensing subunits 115 disposed at the other side (at the second area 134) and the corresponding conductive circuit patterns 120 connected to the sensing subunits 115 are made of the low transparent conductive material.

In this embodiment, because the percentage of the metal mesh and line is decreased, the occurrence of the Moiré phenomenon is further reduced. In addition, the position of the high transparent conductive material is near the controller 104, such that effect of signal sending on the resistance is reduced due to the shorter sending path.

As described above, the sensing patterns and the conductive circuit patterns of the single layer solution touch panel use both high and low transparent conductive materials. In different size and scale of the single layer solution touch panel, the ratio of the high transparent conductive material to the low transparent conductive material is correspondingly adjusted, in which the ratio is 1:1~80:1. In some embodiments, a ratio of 1:1~20:1 is preferred. In addition, a percentage of an area of the high transparent conductive material to an area of the substrate is between 50% and 90%. In some embodiments, a range between 60% and 70% is preferred. A percentage of an area of the low transparent conductive material to an area of the substrate is between 1% and 20%. In some embodiments, a range between 3% and 10 is preferred.

According to one embodiment, the single layer solution touch panel can be fabricated by a photolithography process. The materials of the sensing patterns and the conductive circuit patterns in the single layer solution touch panel include both the high and low transparent conductive materials. The high transparent conductive material is formed on the substrate 102 by lithography process, and the low transparent conductive material is formed on the same substrate 102 by the other lithography process. In order to ensure electrical connection being available, the high and low transparent conductive materials are partially overlapped at an interconnecting region between them, such as the FIG. 1B shown. In general, the high transparent conductive material fabricated under the higher temperature is formed on the substrate 102 first, and then the low transparent conductive material is formed on the substrate 102.

According to one embodiment, one of the high and low transparent conductive materials is formed on the substrate 102 by the lithography process, and the other of the high and low transparent conductive materials is formed on the same substrate 102 by a roll-to-roll process. Similarly, in order to ensure electrical connection being available, the high and low transparent conductive materials are partially overlapped at an interconnecting region between them.

According to one embodiment, the high transparent conductive material and low transparent conductive material are respectively formed by the lithography or gravure process on two substrates 102, and then the substrates 102 are stuck to each other to form the single layer solution touch panel 100 using both high and low transparent conductive materials. Similarly, in order to ensure that electrical connection being available, the high and low transparent conductive materials are partially overlapped at an interconnecting region between them.

Figure 9A:
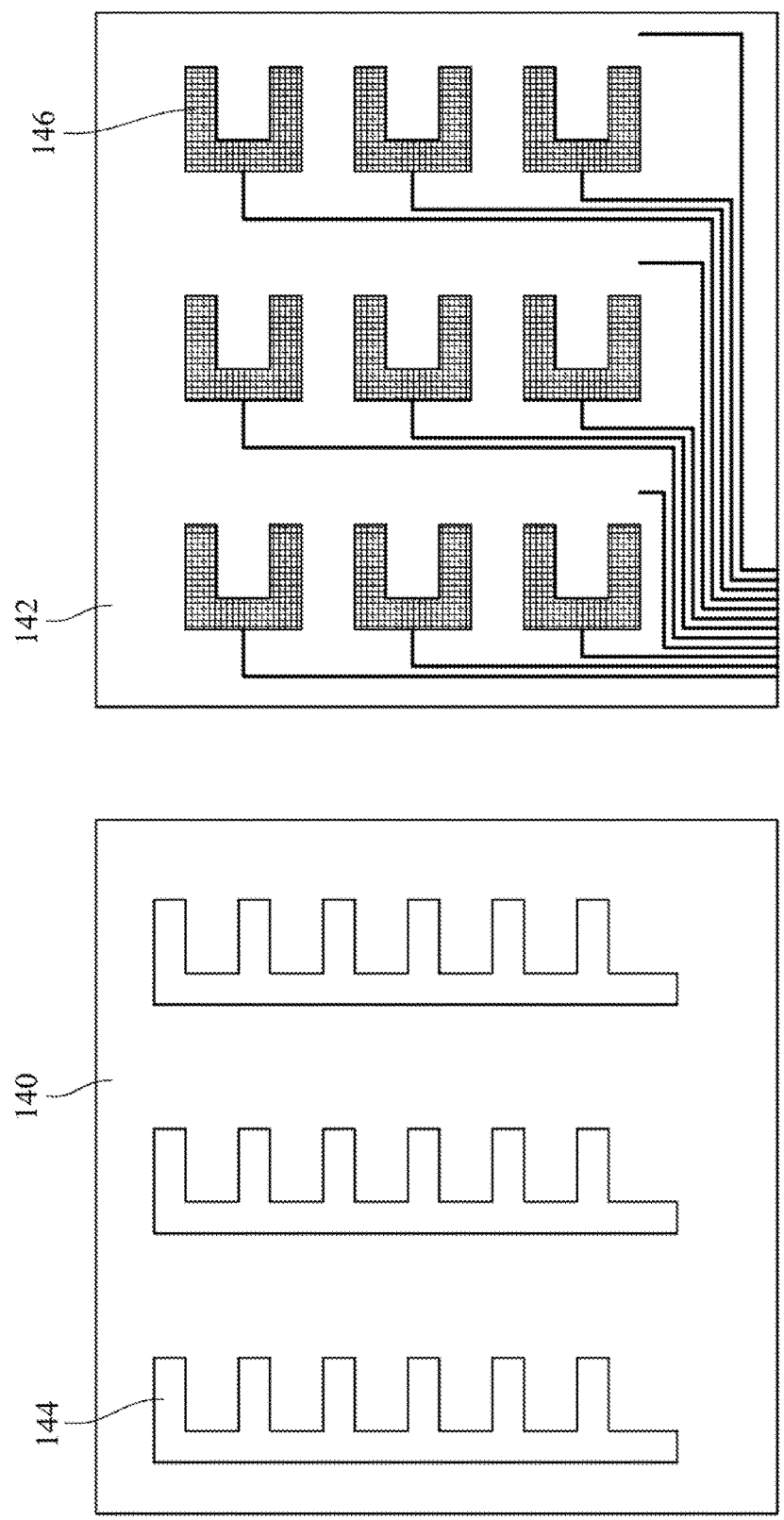
FIG. 9A is a schematic diagram of a high transparent conductive material substrate and a low transparent conductive material substrate according to one embodiment of the present invention.
Figure 9B:
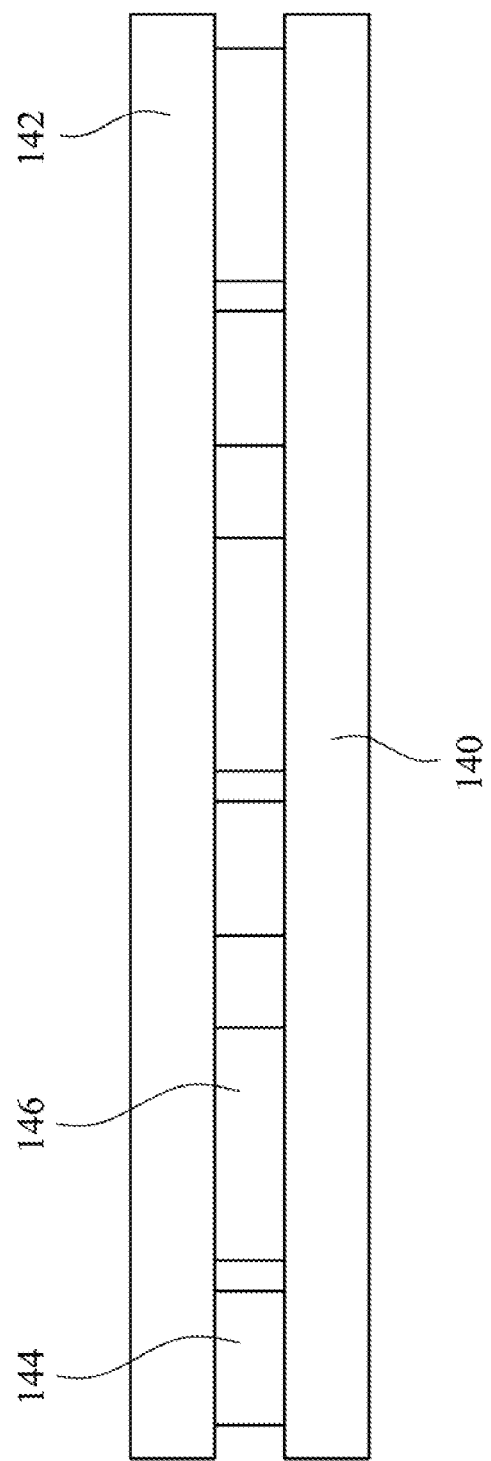
FIG. 9B is a bottom view after an adhering process of FIG. 9A.

FIG. 9A is a schematic diagram of high transparent conductive material substrate and low transparent conductive material substrate according to one embodiment of the present invention. FIG. 9B is a bottom view after an adhering process in FIG. 9A. High transparent conductive patterns 144 and low transparent conductive patterns 146 are formed by the lithography, gravure or other available process on a first substrates 140 and a second substrate 142 respectively. The high transparent conductive patterns 144 and the low transparent conductive patterns 146 can be formed by the same or different processes respectively. Then, the first substrates 140 and the second substrate 142 are stuck to each other, such that the high transparent conductive patterns 144 and the low transparent conductive patterns 146 are between the first substrates 140 and the second substrate 142 to form a single layer solution touch panel structure (as shown in FIG. 9B).

A person having ordinary skill in the art can make a proper modification to shape, arrangement of material, fabrication of the sensing patterns and the conductive circuit patterns.

As described in the above embodiment, the disclosure provides the single layer solution touch panel using both metal and transparent conductive material including TCO and metal or the compositions of them. As a result, comparing to the traditional touch panels merely using transparent conductive materials, the single layer solution touch panel has a lower resistance. Comparing to the traditional touch panels only using metals, the single layer solution touch panel reduces the occurrence of the Moiré phenomenon. In addition, according to the different scale of the single layer solution touch panel, percentage and arrangement of the single layer solution touch panel material can be adjusted.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A single layer solution touch panel, comprising:
   a substrate comprising a touch area and a peripheral area;
   at least one sensing pattern disposed in the touch area, wherein the at least one sensing pattern comprises:
      a sensing main unit comprising a main electrode, at least one finger-shaped electrode, a main conductive line, and at least one extending line, wherein the main electrode and the at least one finger-shaped electrode are electrically connected with each other and have a first comb shape, the at least one finger-shaped electrode is orthogonal to the main electrode, and the main conductive line and the at least one extending line are electrically connected with and orthogonal to each other and have a second comb shape, wherein the main electrode made of an indium tin oxide (ITO) material totally overlaps and directly contacts with the main conductive line made of a metal material, as well as the at least one finger-shape electrode made of the ITO material totally overlaps and directly contacts with the at least one extending line made of the metal material, wherein a vertical projection of the main conductive line and the at least one extending line on the substrate is present within a vertical projection of the main electrode and the at least one finger-shaped electrode on the substrate, and the main electrode and the at least one finger-shaped electrode have a first transmittance greater than a second transmittance of the main conductive line and the at least one extending line; and
      at least one sensing subunit, wherein the at least one sensing subunit comprises at least one opening, and the at least one finger-shaped electrode made of the ITO material is partially located in the at least one opening, as well as the at least one extending line made of the metal material is partially located in the at least one opening, wherein the sensing main unit and the at least one sensing subunit constitute a single layer pattern, and the sensing main unit is electrically isolated from the at least one sensing subunit and does not cross the at least one sensing subunit;

at least one conductive circuit pattern disposed at the peripheral area and extending into the touch area to connect with the at least one sensing pattern; and a controller electrically connected to the at least one sensing pattern via the at least one conductive circuit pattern.

2. The single layer solution touch panel of claim 1, wherein a ratio of the first transmittance to the second transmittance is between 1:1 and 80:1.

3. The single layer solution touch panel of claim 1, wherein a percentage of an area of the ITO material to an area of the substrate is between 50% and 90%.

4. The single layer solution touch panel of claim 1, wherein a percentage of an area of the metal material to an area of the substrate is between 1% and 20%.

5. The single layer solution touch panel of claim 1, wherein the substrate is a rigid substrate or a flexible substrate.

6. The single layer solution touch panel of claim 1, wherein the at least one sensing subunit has the first transmittance.

7. The single layer solution touch panel of claim 1, wherein the at least one conductive circuit pattern partially overlaps with the at least one sensing subunit.

8. The single layer solution touch panel of claim 1, wherein the at least one sensing subunit has a third transmittance less than the first transmittance, and the at least one sensing subunit is mesh-shaped.

9. The single layer solution touch panel of claim 1, further comprising a partition line for defining the substrate into a first area and a second area, wherein a distance between the first area and the controller is greater than a distance between the second area and the controller, and a portion of plurality of the sensing subunits in the first area have a third transmittance less than the first transmittance and is mesh-shaped.

10. The single layer solution touch panel of claim 9, wherein another portion of the plurality of the sensing subunits in the second area have the first transmittance.

11. The single layer solution touch panel of claim 1, wherein the sensing main unit comprises at least one opening defined by the main electrode and a plurality of the finger-shaped electrodes, at least part of the at least one sensing subunit is located in the at least one opening of the sensing main unit.

12. The single layer solution touch panel of claim 1, further comprising a metal line connecting the main electrode to the controller, and the main conductive line is electrically connected to the metal line.

13. The single layer solution touch panel of claim 1, wherein the at least one conductive circuit pattern comprises a short bar and a long bar which are interconnected to each other, the short bar is connected to the at least one sensing subunit, the long bar is connected to the controller, and the short bar and the long bar are made of the metal material, and a portion of the short bar overlaps with the at least one sensing subunit.

14. The single layer solution touch panel of claim 13, wherein the short bar and the long bar are orthogonal.

15. The single layer solution touch panel of claim 1, wherein the at least one extending line is connected to the main conductive line.

* * * * *